INVENTORS
THEODORE A. MILLER
HERBERT L. FOWLER
BY Oldham & Oldham
ATTYS.

INVENTORS
THEODORE A. MILLER
HERBERT L. FOWLER
BY Oldham & Oldham
ATTYS.

INVENTORS
THEODORE A. MILLER
HERBERT L. FOWLER
BY
Oldham & Oldham
ATTYS.

United States Patent Office 3,166,791
Patented Jan. 26, 1965

3,166,791
APPARATUS FOR MAKING DIPPED ARTICLES
FROM THERMOSETTING MATERIAL
Theodore A. Miller, 861 Chestnut Blvd., Cuyahoga Falls, Ohio, and Herbert L. Fowler, Mogadore, Ohio; said Fowler assignor to said Miller
Continuation of application Ser. No. 19,928, Apr. 4, 1960. This application Feb. 12, 1963, Ser. No. 261,932
4 Claims. (Cl. 18—24)

This application is a continuation of U.S. patent application Serial No. 19,928 filed April 4, 1960, entitled "Apparatus for Making Dipped Articles From Thermosetting Material," and now abandoned.

This invention relates to the manufacture of dipped articles from thermosetting material and it is especially useful in the manufacture of hollow artificial fruits, such as grapes for example, although the apparatus may be employed in making other dipped articles.

In the manufacture of artificial fruits for decorative display, it has been proposed to dip a form into a dispersion of thermosetting material such as plastisol and to then heat the form with the deposited material thereon until the material was thermoset. Such a procedure would be slow and costly unless automatic machinery could be developed for handling the forms with a minimum amount of labor.

It is an object of the present invention to provide for the simultaneous manipulation of a multiplicity of dipping forms and to perform the operations of preheating the forms, dipping them in a dispersion of thermosetting material, heating the forms and the deposited material to thermoset the material, cooling the forms with the articles thereon, and removing the finished articles. The invention also has for an object to invert the forms after the dipping step to prevent undue accumulation of the material at the end of the article and to return them to their dependent position after the material has thermoset and before cooling to facilitate the cooling operation.

It is a further object of the invention to provide for removal of the dipped articles from the forms by use of air pressure.

Other objects are to provide uniformity of product and to provide accurately timed control of the operations.

Still a further object is to provide automatic control of withdrawal of forms from the plastisol individual to each group of forms.

These and other objects will appear from the accompanying drawings and the following description.

Figure 1:
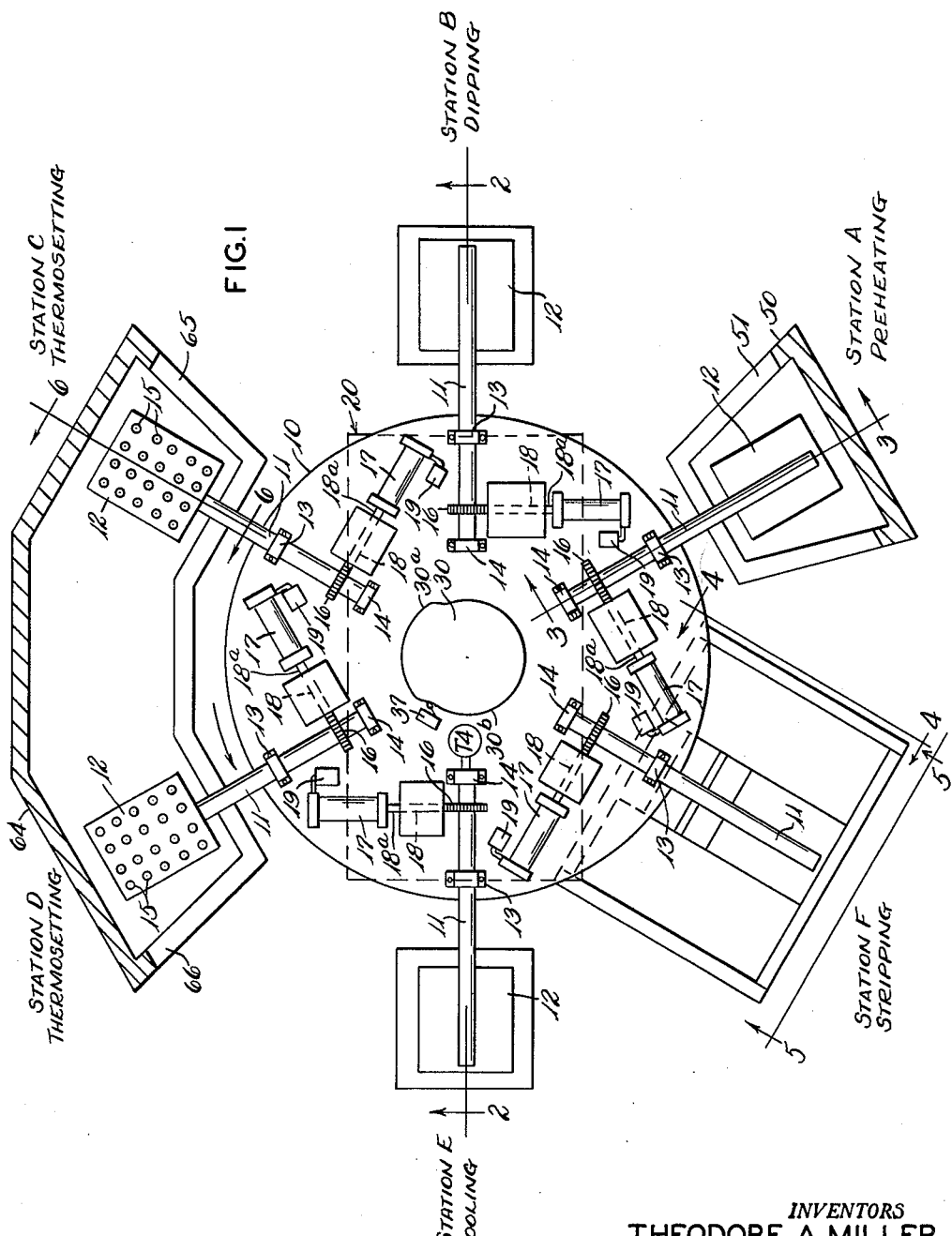
FIG. 1 is a plan view of an apparatus constructed in accordance with and embodying the invention, portions of the control mechanism and the tops of the ovens being broken away and shown in section for simplifying the description.
Figure 2:
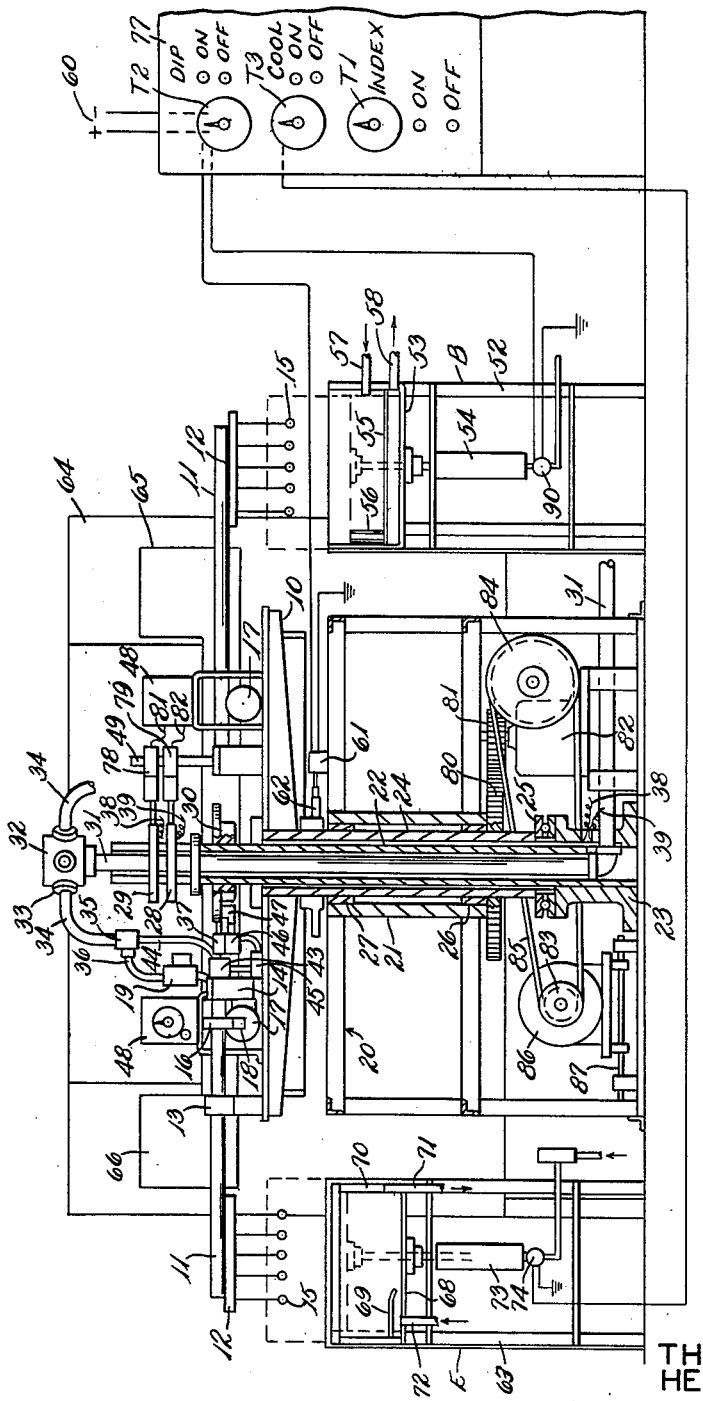
FIG. 2 is a vertical cross-sectional view taken on line 2—2 of FIG. 1 and particularly showing the dipping and cooling mechanism, the turntable and its drive and two of the arm reversing mechanisms, others being omitted.

Referring to the drawings and first to FIG. 1, this shows a turntable 10 rotatable step by step about a vertical axis and having six equidistant arms 11 radiating therefrom. Each arm is in the form of a tubular shaft and has a pallet 12 secured to it at its outer end. Each arm 11 is rotatably mounted in bearings 13, 14 mounted on the table so that the pallets which have dipping forms 15 mounted thereon may be turned to expose the forms vertically either above or below the arm.

As the turntable is rotated step by step in a counter-clockwise direction as seen in FIG. 1, an arm 11 will dwell in succession at station A, the preheating station, station B, the dipping station, stations C and D, the thermosetting stations, station E, the cooling station, and station F, the stripping station. It is desired to have the forms in an erected position after they have left the dipping station B and throughout the thermosetting stations C and D but to turn them to a dependent condition before reaching the cooling station E and throughout their travel past stations E, F, A and B until they approach the thermosetting station C. For reversing the positions of the forms, each arm 11 has a pinion 16 fixed thereto. A double-acting air pressure cylinder 17 is mounted on the turntable, there being one such cylinder for each arm, and the piston of the cylinder has a rack 18 fixed thereto which engages the pinion. Stops are provided on the piston rod 18a so that full possible movement of the rod is the equivalent of 180 degree rotation of the arm 11. The cylinder 17 is controlled by a three-way solenoid operated valve 19.

The turntable 10 is supported by a stationary frame 20 having a vertical bearing sleeve 21. The frame also supports a tubular stationary post 22, concentric with sleeve 21 and anchored in a pedestal 23. The table 10 is mounted on a quill 24 which extends about the post 22 within sleeve 21. A thrust bearing 25 supports the thrust load of the table and bearings 26 and 27 center the quill. The hollow post 22 extends above the turntable 10 a considerable distance. It carries a pair of collector rings 28, 29 for supplying electric power to the mechanism carried by the turntable. It also supports a stationary cam 30. An air line 31 extends through a side opening in pedestal 23 and axially upward through the post to a swiveling manifold 32 having a radial outlet 33 for each arm 11. Each valve 19 is supplied with air under-pressure from an outlet 33 by way of pipe 34, a T 35 and a branch pipe 36. Mounted on the turntable 10 is a limit switch 37, one for each arm 11, having an actuating arm engageable by cam 30. Cam 30 has a raised portion 30a extending about 120 degrees of its circumference that holds switch 37 closed from a position of its arm 11 between the dipping station B and station C to a position between station D and cooling station E, and a lower portion 30b that permits the switch to open during the remainder of its course. As the corresponding arm 11 leaves station B its switch 37 is closed by the cam energizing solenoid valve 19 to reverse supply of air to cylinder 17 rotating the arm 11 through 180 degrees. As the arm leaves station D, the cam releases switch 37 reversing valve 19 and arm 11 rotates back to a position where the forms are dependent. Attitude of the forms is therefore determined entirely by rotational position of the turntable independent of timing of other operations.

Figure 3:
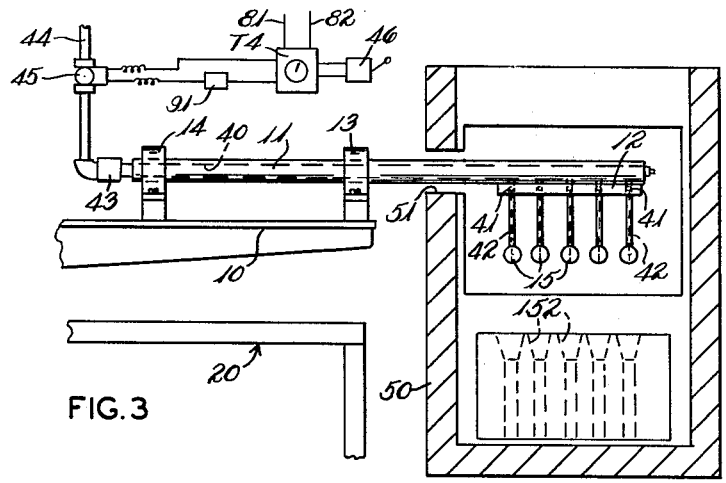
FIG. 3 is a cross-sectional view of the form preheating oven and one of the pallets with its supporting arm and forms.
Figure 11:
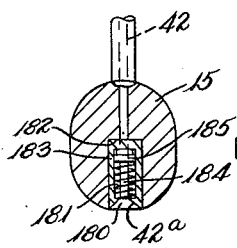
FIG. 11 is an axial sectional view of one of the dipping forms showing the valve normally closing the stripping passage and acting under pressure to assist in stripping the article.

The arms 11 are hollow so as to conduct air under pressure axially thereof as seen in FIG. 3. The hollow bore 40 of the arm 11 is connected with passages 41 in the pallet which in turn connect with passages 42 through the forms to a small hole at the top of each form. To supply air for stripping the article from the form and at the same time applying mechanical pressure axially against the closed end of the article at its inner surface to assist in elongating the article and facilitating entrance of air between it and the form but closing the passage 42 to entrance of plastisol during the dipping step, a conical valve seat 42a is formed at the end of the passage and a conical valve 180 is normally seated in the seat, closing the passage and is held in place against the seat by a coil spring 181. To conveniently provide for mounting the valve, a counterbore 182 is formed in the dipping form as a continuation of the passage 42 and a tubular valve seat member 183 is mounted therein, as seen in FIG. 11. The valve 180 has an axial stem 184 of decreased diameter and the seat member is formed with a cylindrical bore rearwardly of the valve seat in which the spring 181 seated on a shoulder at the valve seat. A collar 185 secured to the valve stem is slightly smaller than the cylindrical bore and provides a seat for the opposite end of the spring while also acting as a loose piston to partially close the passage and act first as a piston to open the valve under air pressure in passage 42 and then to permit passage of air thereabout to blow the article from the form. When air pressure is removed, the spring closes the valve 180 preventing entrance of plastisol during the dipping operation. When air pressure is applied to passage 42, the air acts upon collar 185 forcing the valve against the article to stretch the article slightly away from the form and air pressure about the collar through the valve acts between the article and the form to strip the article from the form.

To supply air under pressure to strip articles from the forms, a rotary slip joint 43 is mounted on the inner end of each arm and is connected by supply pipe 44 with a supply T 35 through a solenoid valve 45. The valve 45 is in turn controlled by a timer limit switch 46 engageable by a stationary cam 47 mounted below cam 30. When an arm 11 reaches the stripping station F its corresponding switch 46 is momentarily closed by cam 47 and energizes its timer T4 which closes switch 91 and admits air under pressure to arm 11 to blow the articles from the forms. At all other positions of the forms the air is shut off.

For controlling the period of blowing air through the forms, an individual timer T4 is provided at each arm of the turntable as shown in FIG. 3 and each timer T4 is connected electrically to the limit switch 46 so as to be started by closing of that switch simultaneously opening the valve 45 by closing switch 91. When the time for which the timer T4 is set has expired the timer closes the relay valve 45 and resets itself. This permits setting of the time of blow individual to an arm and permits different lengths of blows for different dipped articles.

Electric power for operating the timers and solenoids is provided by conductors 38, 39 extending upwardly through hollow post 22 and connecting with collector rings 28, 29. Sliding contacts 78, 79 make contact with the rings and are supported by insulated supports 49 from the turntable. The contacts 78, 79 are connected to each of the timers on the turntable by lines 81, 82.

At station A the forms are heated to a temperature which will promote deposit of plastisol thereon at station B. For this purpose heating means such as an oven 50 may be provided at station A and has a slot 51 through its inner circumferential wall to pass the arm 11 and clearance openings connecting therewith at its radial walls to pass the forms. The oven has a set of heating means such as gas burners 52a below the openings to heat the forms.

At the dipping station B a supporting frame 59 of rectangular cross section and open at its top supports and guides a tank 53 mounted for vertical movement by a lifting air cylinder 54, the cylinder being mounted on the frame 59 with its piston rod 54a connected to the tank. For circulating plastisol and maintaining a constant level, a false bottom 55 is spaced upwardly of the tank bottom to provide a liquid return space. A plurality of tubes 56 project upwardly from the false bottom to the desired level and connect with the return space. An inlet pipe 57 connects the tank with a supply pump, not shown, through a flexible pipe 57a. An outlet pipe 58 connects the return space below the false bottom with the supply. The arrangement provides a flow of clean plastisol through tank 53 at a constant level or depth. Any other constant level means may be used for this purpose.

The dipping step is initiated by arrival of an arm 11 at the dipping station and simultaneous closing of limit switch 61 by one of the six lobes of cam 62. This closes relay switch 110 which closes relay switch 140 thereby energizing timer T2. Simultaneous with the starting of timer T2, the timer energizes the solenoid of a three-way solenoid valve 90 which normally opens the upper end of cylinder 54 to exhaust. Air pressure from line 150 is then supplied through valve 90 to quickly raise tank 53 to its upper position where it remains for a period of time for which the timer T2 is set. The forms are thereby immersed to the desired depth in the plastisol. The plastisol gels about the heated forms during this period. At the end of the period for which the timer T2 is set, valve 90 is de-energized by timer T2, air pressure from line 150 is shut off and the cylinder 54 opened to exhaust.

Figures 9, 10:
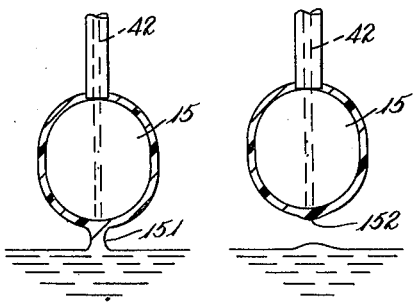
FIG. 9 is a view showing a lower portion of a dipping form with a deposit thereon shown in section and the plastisol from which it is being withdrawn, the form being stopped in its withdrawal near the liquid level of the plastisol.
FIG. 10 is a view similar to FIG. 9 at a slightly later interval with the plastisol and the deposit separated.

With cylinder 54 opened through valve 90 to exhaust the tank 53 would drop as rapidly as air could escape from valve 90. To control the lowering of tank 53 a hydraulic checking mechanism with timed controls is provided. It has been found also desirable to withdraw the forms 15 slowly to permit downward flow of plastisol therefrom. As the forms reach a position where the tips of the forms are at or slightly adjacent the level of the plastisol in the tank, the surface tension of the plastisol causes a constricted neck 151 of plastisol to form connecting the deposit on the form with the plastisol in the tank as shown in FIG. 9. It has been found that stopping relative vertical movement of the forms and the tank at this position permits the neck to narrow and separate with a minimum formation 152 of a terminal drop of plastisol on the form as shown in FIG. 10. After separation of the deposit on the form from the plastisol in the tank, lowering of the tank, or in other words vertical relative movement of the tank and the forms may be resumed at a rapid rate. To accomplish such control, a hydraulic checking cylinder 153 is provided having a piston 154 fixed to a piston rod 155. The rod 155 is threaded, extends parallel to piston rod 54a and is secured thereto for travel therewith by a yoke 156 adjustably secured to the threaded rod.

Piston 154 has ports therethrough held closed by a valve disc 157 under tension of a spring 158. A bypass 159 extends from one end of cylinder 153 to the other about the piston. An adjustable needle valve 160 is adapted to choke the bypass by limiting flow and thereby regulating downward movement of piston 154 whereas upward movement is restricted only by flow through the piston 154. A stop valve 161 is also located in the bypass. It has a cylinder in which a piston valve is held in open valve position by a spring 162. An air supply 163 to the cylinder may press the piston valve against its seat and completely close the bypass 159 to positively stop lowering of tank 53. The air supply is provided through a normally closed solenoid operated valve 164 from air supply line 150. The solenoid valve is controlled by a timer T5.

Another bypass 165 is provided about needle valve 160 and includes a normally closed air operated skip valve 166. This skip valve has a piston 167 operating in a cylinder supplied by air under pressure from line 150 through a normally closed solenoid valve 168. The solenoid of valve 168 is normally energized and held open by a normally closed contact of a single pole double throw limit switch 169 mounted on frame 59.

The check cylinder 153 may also have its lower end connected as by line 170 to a spring loaded balance cylinder 171 which acts as a reservoir for the volume of oil displaced by the piston 155 on the downward stroke and returns the displaced oil on the upward stroke.

Limit switch 169 also has a normally open contact which when closed energizes solenoid valve 168 to close it and open skip valve 166 to permit fast drop of the tank 53, the timer contact of T5 controlling solenoid valve 164 being simultaneously opened to close valve 164 and open the stop valve 161.

Limit switch 169 has a long operating finger 173 which stands in the path of a stop 172 on the tank 53 hereafter described. When timer T2 de-energizes solenoid valve 90 allowing the tank to descend, stop valve 161 being held open by spring 162 and skip valve 166 being held closed by air pressure from line 150, descent of the tank 53 is controlled so that it lowers at a slow speed by needle valve 160. When the tank 53 is lowered to a point where the tips of the forms are at the level just above the liquid level of the tank the stop 172 meets the operating finger 173 of limit switch 169. This opens the skip valve contact of that switch, de-energizing and closing solenoid valve 168 thereby opening the skip valve, but simultaneously closes the other contact of limit switch 169 which energizes and starts timer T5 and simultaneously timer T5 energizes solenoid valve 164 which opens it closing the stop valve 161 causing the tank 53 to dwell at this position for the period for which timer T5 is set. The surface tension of the plastisol removes the last drop from the forms during this period. At the end of the dwell period for which timer T5 is set, the timer de-energizes and closes solenoid valve 164 which opens stop valve 161, the skip valve 166 is still open bypassing the needle valve 160 and the tank 53 descends rapidly to its lowest position. The long finger 173 of limit switch 169 permits the lowering motion without changing its contacts but on the next rise of the tank, the switch 169 closes the circuit to the skip air valve 168 closing the skip valve 166 and opens the circuit to timer T5 which resets itself, simultaneously closing the stop valve 161.

Where the forms supported by different arms 11 are of different lengths the positions at which the tank 53 dwells during the return stroke will be different. To provide for stopping the descent of the tank at the correct level for each set of forms automatically, a pin 175 is mounted horizontally on tank 53, a ratchet wheel 176 is rotatably mounted on the pin and has a six-sided turret 177 fixed thereto, friction means being provided so that the ratchet wheel and turret rotation are frictionally controlled. A ratchet arm 178 is rotatably mounted on pin 175 and has a spring pressed pawl 179 which engages the ratchet. For rotating the arm 178, a link 190 has one end pivotally mounted at 191 on the arm, its other end being pivotally mounted at 192 on frame 59. Each face of the hexagonal turret has a tapped opening in which a threaded stop 172 is adjustably secured so as to project radially of the turret. The lowermost stop is positioned for engagement with finger 173 of the limit switch 169. The arrangement is such that at each ascending movement of the tank 53 the turret is rotated through a sixty degree angle to present a stop 172 suitably positioned to operate the switch 169 at the proper level to the forms then over the tank.

All of the timers mentioned in the description are of the type used in timing photographic exposures and similar operations. They have a dial about which an indicator hand rotates. The indicator is manually set for the length of operation desired. Upon momentary closure of a contact the timer hand starts rotating through the desired arc of travel and simultaneously a circuit to be timed is closed. At the expiration of the desired period of time the circuit to be timed is closed and the timer resets itself. Such a timer is the F. R. Interval Timer made by F. R. Corporation, 951 Brook St., New York city.

Figure 6:
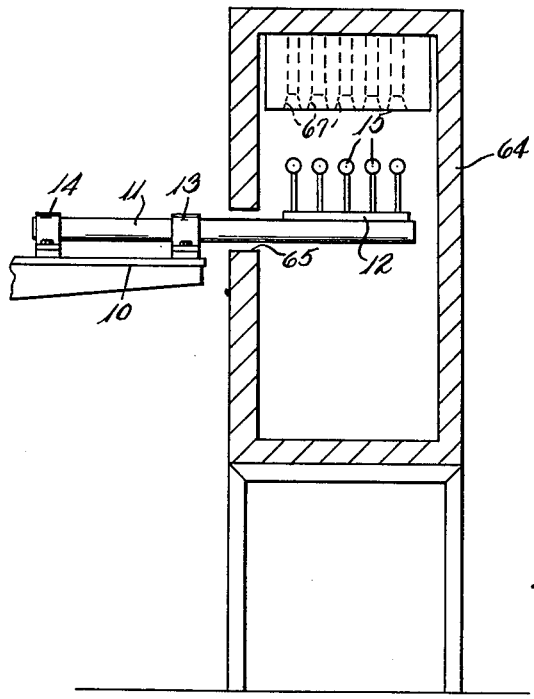
FIG. 6 is a sectional view of the thermosetting oven, taken on line 6—6 of FIG. 1.
Figure 7:
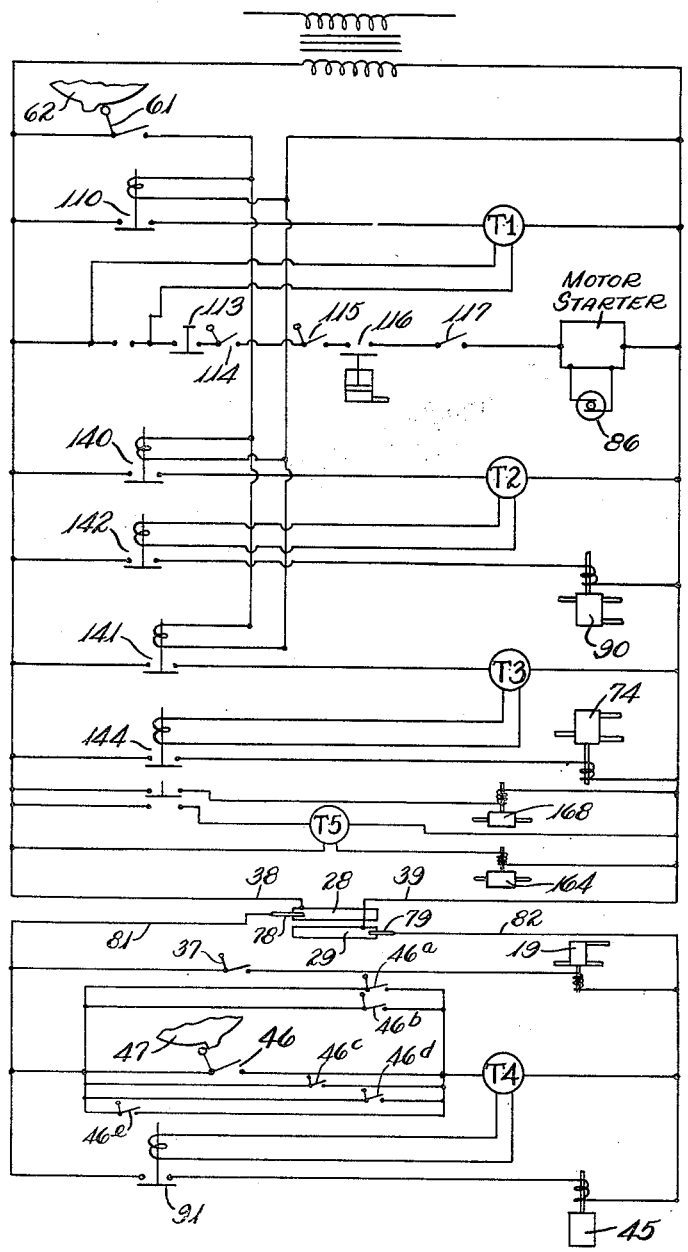
FIG. 7 is a schematic wiring diagram of the apparatus.
Figure 8:
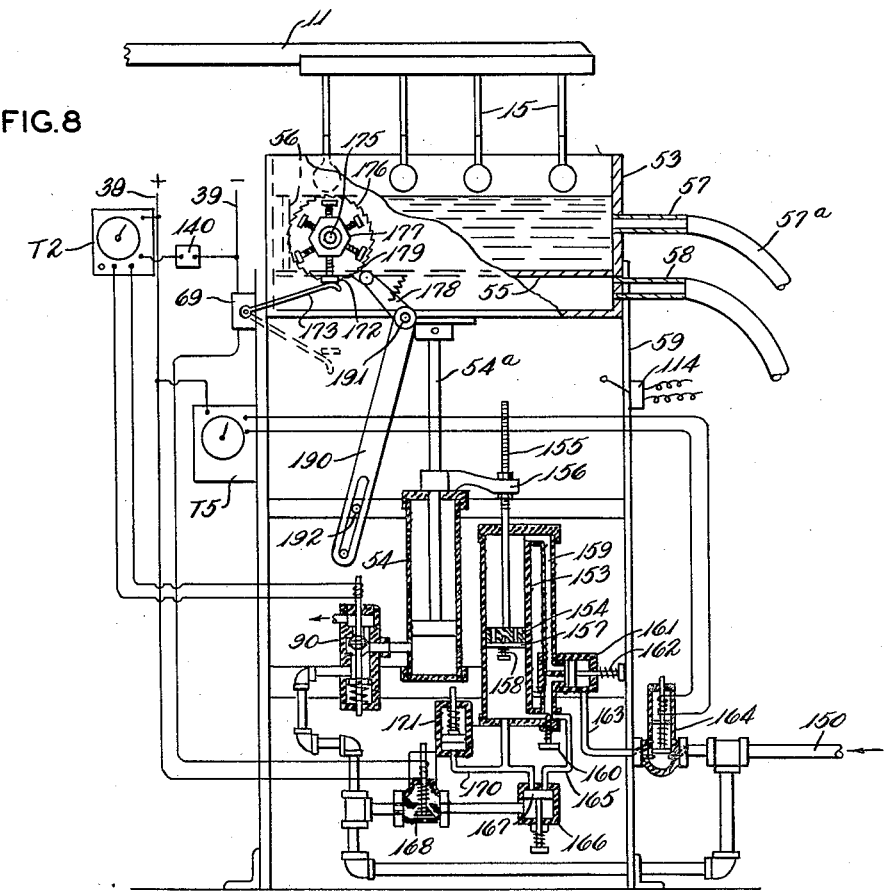
FIG. 8 is a side view of the dipping apparatus, partially broken away and partially in section.

After dipping the forms are reversed as herein described in order to cause uncongealed material to flow toward the neck of the forms and prevent presence of a drop at the ends of the articles. The thermosetting at stations C and D is accomplished by passing the forms through a heated oven 64. This oven 64 as seen in FIG. 6 is similar to the preheating oven except that the articles travel further therethrough, the forms are in a dependent position and the entrance and exit openings 65 and 66 respectively therefore differ accordingly, and the gas burners 67 are located in the top of the oven above the forms. Thermosetting time is dependent only upon the length of periods between step to step movements or indexing of the table.

Except for the construction of the tank and the controls therefor, the cooling station E is substantially like the dipping station. A frame 63 slidably supports a cooling tank 68 for vertical movement. The tank has an overflow standing pipe 70 therein. A drain tube 71 is provided connected to the overflow and an inlet tube 72 supplies cooling water and is connected to the bottom of the tank by a flexible hose (not shown). Water at temperature controlled by a thermostat is supplied to the tank. A baffle 69 is mounted over the inlet to prevent excessive currents. A vertical double-acting air cylinder 73 is provided to raise and lower the tank and is controlled by a three-way solenoid operated valve 74. Limit switch 61 has been previously mentioned as mounted on frame 20 in position to be closed by each of the six steps of rotating cam 62. Closing of the switch 61 by a step of cam 62 upon arrival of an arm 11 at a dwell position closes a circuit through the solenoid switch 141 of timer T3 which controls relay switch 144 which energizes the solenoid of valve 74. The timer T3 is similar to timer T1 and upon expiration of a period of time, for which it has been set, it de-energizes solenoid valve 74 lowering the tank 68 and resetting itself. As a result, cooling may be stopped at any point short of the indexing period of the table.

For rotating the turntable, a gear 80 is mounted on the lower end of quill 24 in position to mesh with a pinion 81 on a speed reducer 82 driven through pulleys 83, 84 and belt 85 from an electric motor 86. Motor 86 is mounted on rails 87 to provide belt adjustment.

Operation of the motor to provide step to step movement of the turntable is controlled by an index timer T1 on the control board. Closing the main switch on the control board starts the motor 86 provided the cooling and dipping tanks are both in lowered position.

The motor is controlled by normally closed contacts 111 of timer T1 in series with a foot operated safety cutout switch 113, two normally closed limit switches 114, 115, an air pressure closed, normally open switch 116 and a manually operated switch 117. Limit switches 114 and 115 are positioned at the dipping and cooling tanks respectively and are closed only when those tanks are lowered to make certain that indexing of the turntable does not take place when the tanks would interfere with such indexing movement. Switch 117 is a snap open and close switch on the switchboard. Switch 116 is closed only when air pressure is available to operate the fluid pressure cylinders.

Now, providing all of switches 113, 114, 115, 116 and 117 are closed and contacts 111 closed in the de-energized condition of timer T1 motor 86 will be energized whenever power is applied to lines 38, 39 and the turntable will be rotated until a hump or lift on cam 62 closes limit switch 61 thereby energizing timer T1 which simultaneously opens contacts 111 of timer T1 stopping the motor. At the expiration of the desired waiting period for which the timer is set, the timer T1 again closes its contacts 111 and resets itself.

Figure 4:
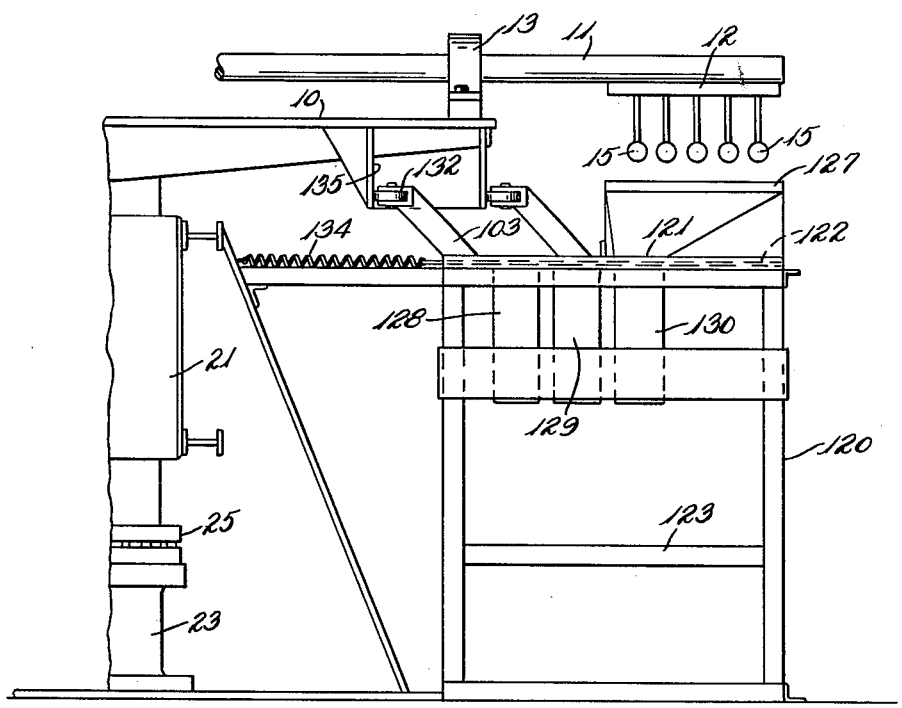
FIG. 4 is a sectional elevation taken on line 4—4 showing the article collector at the stripping station.
Figure 5:
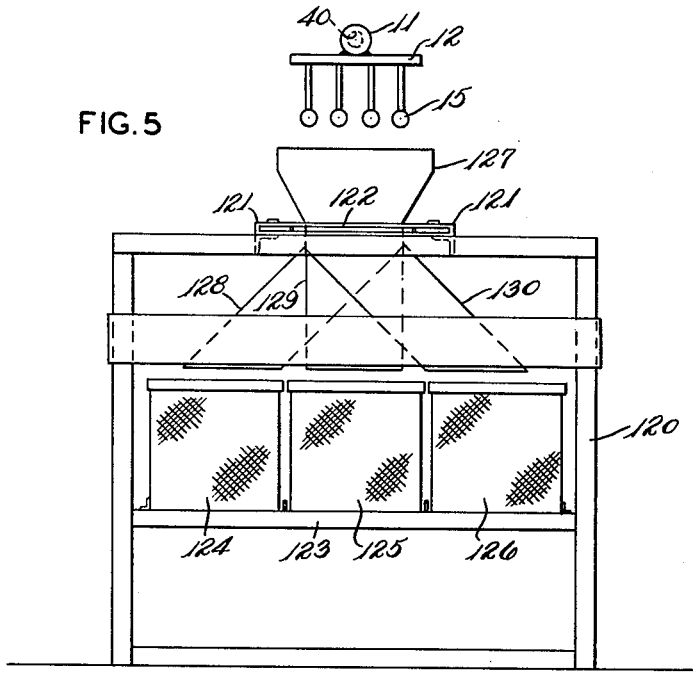
FIG. 5 is a sectional view of the stripping station, taken on line 5—5 of FIG. 1.

Article classifying apparatus is provided at the stripping station and is shown particularly in FIGS. 4 and 5. When the forms of one arm are of one shape or size and forms on other arms are of other shapes or sizes, it is desirable to keep the articles produced thereon separate. For separating and classifying the finished articles a frame 120 is provided at the stripping station and has spaced parallel guide rails 121 for guiding a slide 122. A shelf 123 below the slide supports a plurality of boxes 124, 125, 126 of mesh wire construction. A hopper 127 above the slide 122 is mounted in vertical alignment with a pallet at the stripping station to receive articles blown from the forms. The slide 122 has a multiplicity of openings therethrough each of area and shape corresponding to the lower end of the stationary hopper, the slide being movable to align a desired opening therethrough with the hopper. Secured to the bottom of the slide are a multiplicity of chutes 128, 129, 130. Boxes 124, 125 and 126 are of elongate rectangular form and are arranged with their lengths in the direction of movement of the slide. Chutes 128, 129 and 130 have their delivery ends laterally disposed so that chute 128 delivers only to box 124, chute 129 delivers only to box 125 and chute 130 delivers only to box 126.

For moving the slide 122 a cylindrical cam 135 is mounted below the lower face of the turntable 10. A cam following roller 132 is mounted on a bracket 103 fixed to the slide 122 and a coil spring 134 has one end secured to the slide and the other secured to the frame 20 which supports the turntable. The cam 135 may be so formed that when one arm 11 is over the hopper one chute is aligned with the hopper opening and with another arm at the stripping station a different chute is aligned with the hopper.

The operation of the apparatus will be apparent from the above description of the mechanism. Briefly, however, the operation is as follows:

The main switch is closed energizing the control lines 38, 39. The turntable starts to rotate and when the next hump or lift of cam 62 closes limit switch 61, timers T1, T2, and T3 are energized simultaneously to start their timing cycles and simultaneously with energizing of timer T1 its contacts 111 are opened stopping motor 86 until the time for which it is set expires at which time contacts 111 are closed and the motor again started. The timer cycles of T2 and T3 are shorter than that of T1 but should the dipping and cooling tanks not be returned to their lowest position when the time interval of timer T1 expires they will not close limit switch 114 or 115 and the motor cannot start. Similarly if air pressure should not be present in supply line 150, switch 116 would be open and the motor would not start until air pressure was provided.

As the turntable proceeds to rotate the cam 30 opens and closes limit switch 37 causing the hollow arms to rotate back and forth through an angle of 180 degrees to present the forms in desired positions at different stations, dependent at the cooling, stripping, preheating and dipping station, and erect at the other stations.

As an arm arrives at the stripping station, cam 47 closes limit switch either 46, 46a, 46b, 46c or 46e, starting the timer T4 and simultaneously operating the valve 45 to apply air pressure to strip the articles from the forms. The timer T4 shuts off air supply at a set time.

The dipping and cooling operations start simultaneously with start of the index dwell and end according to setting of their timers.

In the embodiment shown and described, gas fired ovens have been shown both for preheating and for thermosetting. It will be apparent that other heating means such as electric radiant heat, or other well known heating means may be employed in place of the gas burners and the articles may or may not be enclosed by ovens at the heating stations.

The invention has been particularly described for operations upon liquid PVC plastisol. However, at least certain of the advantages of the invention may be retained in operations upon other plastic materials, both thermosetting and thermoplastic, including polyethylene, cellulose acetate, and cellulose butyrate, and polystyrene, including powders.

While a certain embodiment and details have been shown for purposes of illustrating the invention, it will be apparent to those skilled in the art that various changes and modifications may be made therein without departing from the spirit or scope of the invention.

What is claimed is:

1. Apparatus for making dipped articles from thermoset plastic liquid, said apparatus comprising a rotatable turntable, means for indexing the turntable, a multiplicity of hollow arms radiating therefrom, plates supporting forms on the outer ends of said arms, certain of the plates supporting forms of different length, said plates and forms having passages therethrough for conducting fluid under pressure for removing articles therefrom, means for rotating said arms relative to said turntable to present said forms in dependent or erect positions at different stations, a tank of said liquid at one of said stations, means for raising and lowering said tank to immerse dependent forms in said liquid during a dwell at said station, timing means adjustable during the operation of the apparatus for controlling the dwell of a form at said stations, a second timing means adjustable during the operation of the apparatus means for controlling the time of immersion of a form in said liquid at said one of said stations, and means automatically set by the indexing of the conveyor for controlling the withdrawal of each plate of forms from immersion at the immersion station to provide for the withdrawal of forms of different length.

2. Apparatus for dipping forms in a dispersion of thermosetting material, said apparatus comprising a conveyor for moving forms step by step from station to station, a dipping tank at one station, means for controlling raising and lowering the dipping tank, said last-named means including a fluid pressure operated cylinder and control means for quickly and fully raising and controllably lowering the tank, said controllable lowering means including a check cylinder having a piston adjustably connected to the piston of the pressure cylinder, needle, stop and skip valves in a bypass connecting the ends of the check cylinder, means connecting the needle valve only in the bypass to control the slow lowering of the tank as the forms are withdrawn therefrom, means for operating the stop valve to close the bypass just as the forms leave the tank, an interval timer adjustable during the operation of the apparatus for controlling the time of closure of the stop valve and the dwell of the forms as they leave the tank, and means operable upon opening of the stop valve to open the skip valve to bypass the needle valve and allow quick descent of the tank.

3. Apparatus for dipping forms in a dispersion of thermosetting material, said apparatus comprising a conveyor for moving sets of forms step by step from station to station, a dipping tank at one station, means for controlling raising and lowering the dipping tank, said last-named means including a fluid pressure operated cylinder for raising and lowering the tank, a check cylinder having stop and skip valves in a bypass thereabout for controlling gravitationally downward movement of the tank in a slow descent, stop and quick descent program, an interval timer adjustable during the operation of the apparatus and set in operation by arrival of a form at the station for controlling said fluid pressure cylinder to raise the tank to form dipping position and to hold it here for a selected period, and a second interval timer adjustable during the operation of the apparatus and set in operation by downward movement of said tank for controlling said stop and skip valves to control the stop time in between the slow and quick descent of the tank, and means controlled by raising and lowering of said tank for setting the position of operation of the stop and skip valves automatically for each set of forms at a position where the form just leaves the thermosetting material independent of the length of forms carried in succession by the conveyor.

4. Apparatus for dipping forms in a dispersion of thermoplastic material, said apparatus comprising means for moving forms step by step from station to station, a dipping tank at one station, means for controlling raising and lowering the dipping tank, said last named means including a fluid pressure control means for quickly and fully raising and controllably lowering the tank, said controllable lowering means including a check cylinder having a piston adjustably connected to the fluid pressure control means, needle, stop and skip valves in a bypass connecting the ends of the check cylinder, means connecting the needle valve only in the bypass to control the slow lowering of the tank as the forms are withdrawn therefrom, means for operating the stop valve to close the bypass just as the forms leave the tank, an interval timer adjustable during the operation of the apparatus for controlling the time of closure of the stop valve and the dwell of the forms as they leave the tank, and means operable upon opening of the stop valve to open the skip valve to bypass the needle valve and allow quick descent of the tank.

References Cited by the Examiner
UNITED STATES PATENTS

| | | | |
|---|---|---|---|
| 1,272,348 | 7/18 | Crawford | 18—24 |
| 1,946,360 | 2/34 | Roberts | 18—24 |
| 2,021,299 | 11/35 | Gammeter | 18—24 |
| 2,041,788 | 5/36 | Sprunger | 18—24 |
| 2,241,176 | 5/41 | Boecler et al. | 18—24 |
| 2,389,319 | 11/45 | McMordie et al. | 18—24 |
| 2,437,109 | 3/48 | Marquat | 18—24 |
| 3,007,195 | 11/61 | Gammeter | 18—2 |

WILLIAM J. STEPHENSON, *Primary Examiner.*